Figure 1:
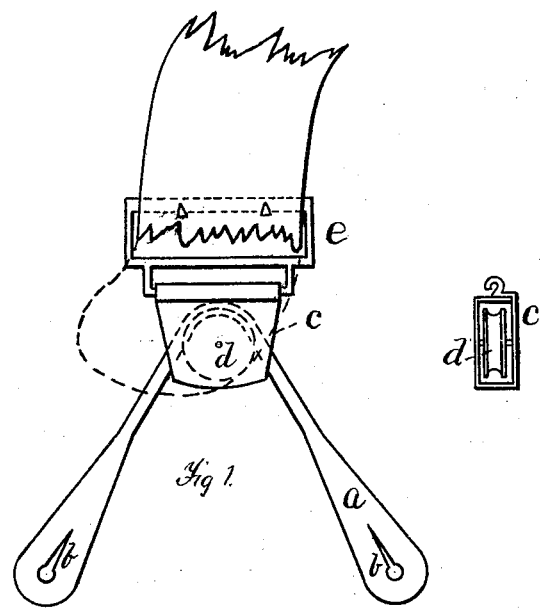

J. DUNNING.
Suspenders.

No. 149,382. Patented April 7, 1874.

Witness
W. E. Brown
J. D. Warren

Inventor
James Dunning
Per Wm Franklin Seavey Atty

UNITED STATES PATENT OFFICE.

JAMES DUNNING, OF BANGOR, MAINE.

IMPROVEMENT IN SUSPENDERS.

Specification forming part of Letters Patent No. 149,382, dated April 7, 1874; application filed January 2, 1874.

*To all whom it may concern:*

Be it known that I, JAMES DUNNING, of Bangor, in the county of Penobscot and State of Maine, have invented certain new and useful Improvements in Suspenders; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1 shows a front view with the pulley in dotted lines.

The object of my invention is to add to the ease and durability of suspenders and shoulder-braces. It consists of a small pulley attached to the buckle, or, in cases where the sliding fastening is used, to the webbing of the suspender, over which the button-hole tag passes. This allows the tag to adjust itself readily to the movements of the person, and keeps the strain equally divided between the buttons to which the tag is attached.

The drawing at $a$ shows the ordinary button-hole tag having a button-hole, $b$, at each end. At $c$ is shown a loop of any suitable material, (metal I consider excellent,) containing a pulley, $d$, over which the tag $a$ passes. The loop in this case is shown as attached to the lower part of the buckle $e$; but, as stated, it may, in some cases, be attached directly to the webbing, or to a ring or loop attached thereto. In fact, this would be necessary when the device was used on the back of the suspender. The loop $c$ may be varied, as taste may dictate, and, if desired, may be covered.

What I claim as my invention, and desire to secure by Letters Patent, is—

The combination of the loop and pulley $c\ d$, with a suspender-buckle, substantially as herein described.

In testimony that I claim the foregoing I have hereunto set my hand this 27th day of December, 1873.

JAMES DUNNING.

Witnesses:
WM. FRANKLIN SEAVEY,
C. W. ROSS.